(12) United States Patent
Huebner et al.

(10) Patent No.: US 9,783,116 B2
(45) Date of Patent: Oct. 10, 2017

(54) CARGO AREA DIVIDER SYSTEM

(71) Applicant: FORD GLOBAL TECHNOLOGIES, LLC, Dearborn, MI (US)

(72) Inventors: Annette Lynn Huebner, White Lake, MI (US); Kristin Ann Hellman, Walled Lake, MI (US); Justin Strong, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/603,783

(22) Filed: Jan. 23, 2015

(65) Prior Publication Data

US 2016/0214539 A1 Jul. 28, 2016

(51) Int. Cl.
*B60R 7/02* (2006.01)
*B60R 5/04* (2006.01)

(52) U.S. Cl.
CPC . *B60R 7/02* (2013.01); *B60R 5/04* (2013.01)

(58) Field of Classification Search
CPC .................................. B60R 5/04; B60R 7/02
USPC .......................... 296/37.14, 24.33, 37.1, 37.8
See application file for complete search history.

(56) References Cited

U.S. PATENT DOCUMENTS

| 6,015,071 | A | * | 1/2000 | Adomeit | B60R 7/02 |
| | | | | | 220/6 |
| 6,056,177 | A | | 5/2000 | Schneider | |
| 6,135,527 | A | | 10/2000 | Bily | |
| 7,201,421 | B2 | * | 4/2007 | Reynolds | B60R 7/02 |
| | | | | | 224/400 |
| 7,959,390 | B2 | | 6/2011 | Gorski | |
| 8,215,693 | B2 | * | 7/2012 | Ulita | B60R 5/04 |
| | | | | | 296/37.1 |
| 2006/0180623 | A1 | | 8/2006 | Reynolds et al. | |

FOREIGN PATENT DOCUMENTS

EP 2436561 B1 9/2012

* cited by examiner

*Primary Examiner* — Joseph D Pape
*Assistant Examiner* — Dana Ivey
(74) *Attorney, Agent, or Firm* — Vichit Chea; Brooks Kushman P.C.

(57) ABSTRACT

A vehicle having a storage compartment includes a floor defining a track, a plurality of panels pivotally connected to the floor, and an arm pivotally attached to an upper portion of each of the panels. The arm is adapted to be pivoted to a folded position in the plane of the panel to a floor supported position connected to the track. The arm is also adapted to be pivoted to a panel supported position connected to an adjacent panel.

16 Claims, 4 Drawing Sheets

CARGO AREA DIVIDER SYSTEM

TECHNICAL FIELD

This disclosure relates to cargo area storage systems for vehicles.

BACKGROUND

Vehicles have cargo areas that are used by customers to store items and transport cargo. Vehicle cargo areas may be wide open areas that do not include a storage system with separate compartments. Storage systems may be incorporated in cargo areas as original equipment or as an aftermarket accessory. Such systems may define fixed, un-adjustable compartments. Storage systems with fixed sized compartments may not provide for an efficient use of the cargo area. Storage systems that are too large allow the cargo to shift and slide. Cargo compartments that are too small cannot be used to hold the cargo. Storage systems having dimensions inappropriate for certain items may take up space within the cargo area and may have to be removed from the cargo area of the vehicle, or stored within the vehicle. Storing the storage system within the vehicle is counterproductive because it takes away from the available storage space. Storage systems that lack adaptability present problems for customers needing a variety of storage options for the cargo area of the vehicle.

Vehicle cargo areas may be provided storage systems that include dividers to aid customers in organizing items in the cargo area. These storage systems with stationary dividers split the storage space into pre-defined areas. Storage systems using stationary dividers lack adjustability. The location of the stationary dividers may improperly divide the space for customers with a variety of items ranging in size and shape. Storage systems having stationary dividers are not collapsible and may reduce space needed for larger items.

This disclosure is directed to solving the above problems and other problems as summarized below.

SUMMARY

A vehicle having a storage compartment includes a floor defining a track, a plurality of panels pivotally connected to the floor, and an arm pivotally attached to an upper portion of each of the panels. The arm is adapted to be pivoted to a folded position in the plane of the panel to a floor supported position connected to the track. The arm is also adapted to be pivoted to a panel supported position connected to an adjacent panel.

A vehicle cargo storage system includes at least one panel hingedly connected to a floor, a track disposed on the floor adjacent to the panel, and an arm. The track defines a plurality of grooves disposed along the track. The arm has a first end disposed on the panel, and a second end configured to extend away from the panel and engage the grooves on the track.

A vehicle storage system includes at least one panel hingedly connected to a floor. The panel is configured to extend away from the floor about a first end. The vehicle storage system further includes at least one arm connected to a second end of the panel. The arm is configured to extend toward and engage the floor such that the panel is substantially perpendicular to the floor.

DETAILED DESCRIPTION

Embodiments of the present disclosure are merely examples and other embodiments can take various and alternative forms. The figures are not necessarily to scale and some features are exaggerated or minimized to show details of particular components. The structural and functional details disclosed are not to be interpreted as limiting, but merely as a representative basis for teaching one skilled in the art how to practice the present invention. The various features illustrated and described with reference to any one of the figures can be combined with features illustrated in one or more other figures to produce embodiments that are not explicitly illustrated or described.

Figure 1:
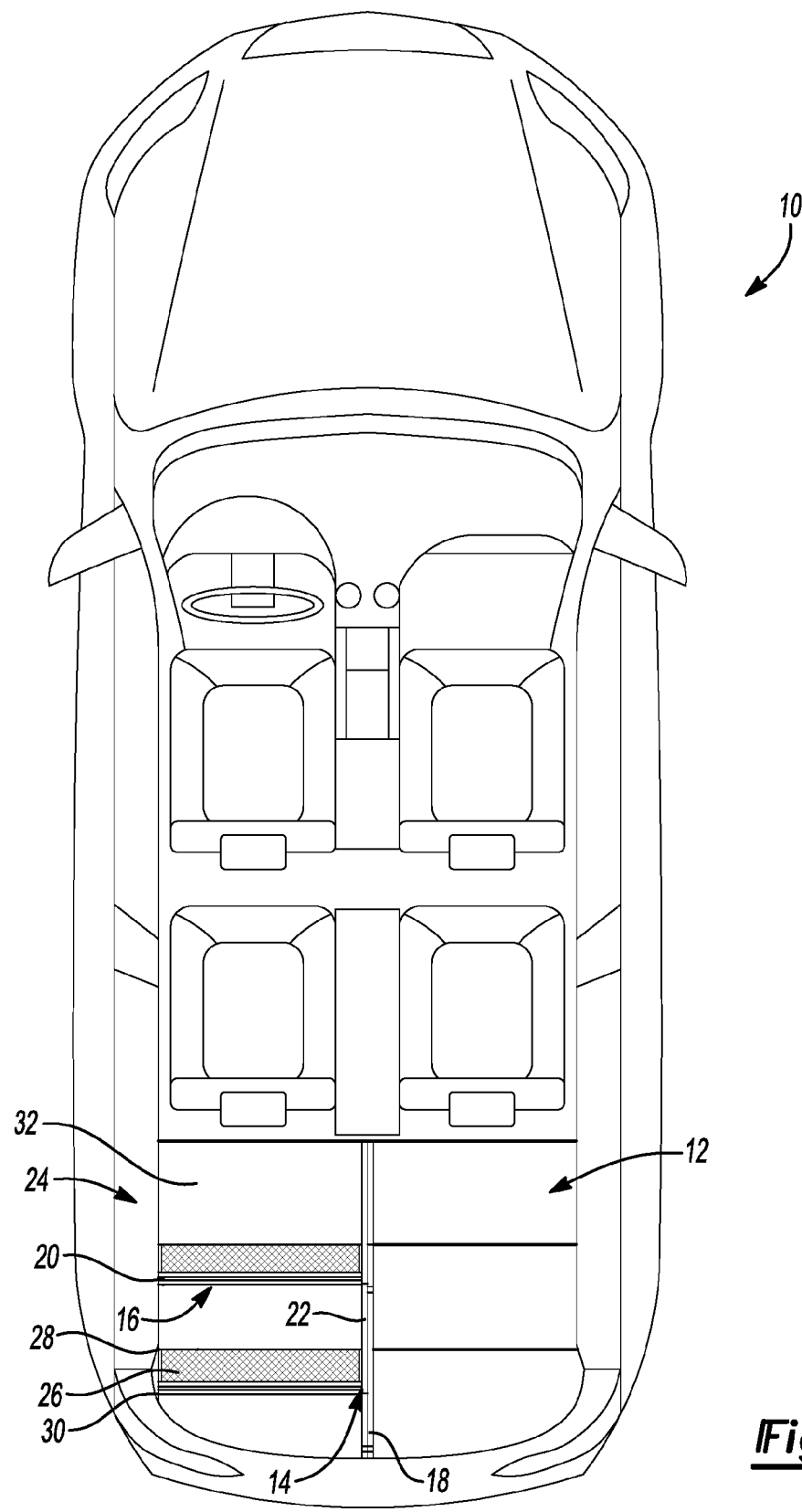
FIG. 1 is schematic top plan view of a vehicle having a cargo area storage system made according to one embodiment of this disclosure.

Referring to FIG. 1, a vehicle 10 is shown that includes a cargo area 12. The cargo area 12 includes a storage system 14. The storage system 14 acts as a divider assembly for the cargo area 12. The storage system 14 includes a plurality of panel assemblies 16 and a plurality of tracks 18. Alternatively, the storage system 14 may include a single track or more than two tracks. The panel assemblies 16 include a panel 20 and an arm 22. The arm 22 is pivotally attached to an upper portion 21 of each of the panels 16. When deployed, the panel assemblies 16 engage the track 18 allowing the storage system 14 to define a plurality of cargo compartments 24 within the cargo area 12. As will be discussed in more detail below, the storage system 14 may be reconfigured by positioning the panels to provide a variety of cargo compartments 24. Cargo compartments 24 may be configured to define a variety of different dimensions by simply repositioning the panel assemblies 16.

As shown in FIG. 1, the storage system 14 of the present disclosure is configured to allow a variety of different items to be stored within the cargo area 12 of the vehicle 10. Using an adjustable storage system 14, the cargo area 12 may accommodate items having a wide variety of dimensions. Storage system 14 is configured to support and retain large items as well as small items within the cargo area 12. The storage system 14 is configured to separate items stored within the cargo area 12. The storage system 14 may be adjusted to retain and separate items within the cargo area 12 to prevent damaging the items. The storage system 14 is adjustable to divide the cargo area 12 of the vehicle 10 to accommodate items of various sizes and shapes.

The panel assemblies 16 include a net 26 that is attached to the panel 20 between a first end 28 and a second end 30 of the panel 20. The net 26 is attached to the panel 20 using mechanical fasteners, such as snaps (not shown), hooks, buttons, or the like. Alternatively, the net 26 may be formed, stitched, or adhered to the panel 20. The net 26 facilitates the storage and transport of small items. The net 26 is adapted to retain smaller fragile items that may be damaged in transport. The net 26 secures those items to the panel 20 to minimize any potential damage to the items.

The storage system 14 is a self-storing system that may be collapsed to fit within the cargo area 12. The storage system 14 when not in use does not require substantial storage space. The self-storing system allows more efficient use of the space within the cargo area 12 and provides customers with flexibility when utilizing the cargo area 12. The self-storing system when not in use may be completely stored and does not need to be stored outside the vehicle 10.

Figure 2:
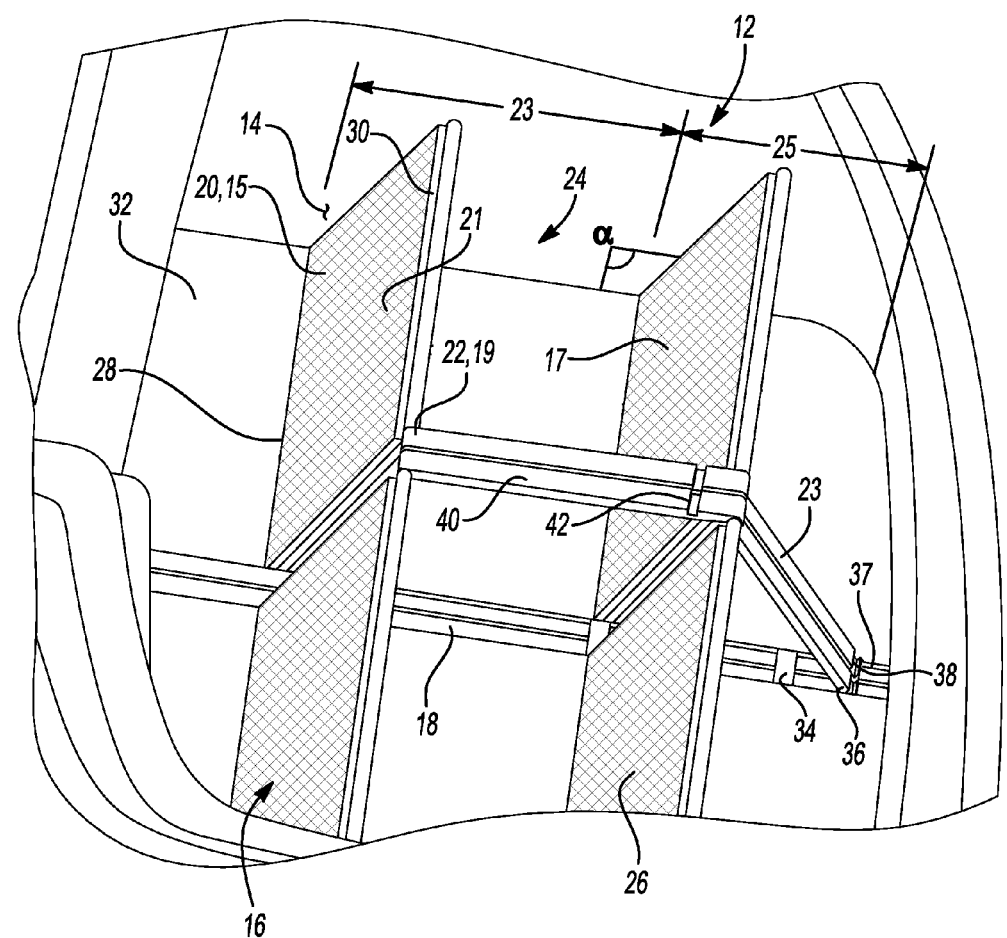
FIG. 2 is a fragmentary perspective view of a vehicle cargo area with the storage system shown in FIG. 1 in a deployed position.

Referring to FIG. 2, a cargo area 12 is illustrated that has a deployed storage system 14. Storage system 14 uses a plurality of panel assemblies 16 to define a plurality of cargo compartments 24 within the cargo area 12 of the vehicle 10. A plurality of panel assemblies 16 is interconnected to form the cargo compartments 24. Each panel 20 of the plurality of panel assemblies 16 includes the arm 22 such that a first panel assembly 15 includes a first arm 19 and a second panel assembly 17 includes a second arm 23.

Interconnections between the panel assemblies 16 are discussed in more detail below. The panel assemblies 16 include an arm 22 that may be connected to the panel 20 or the track 18 in the floor 32. A first end 28 of the panel is connected to the floor 32 of the cargo area 12. The first end 28 of the panel 20 is hinged to the floor 32. The arm 22 is pivotably connected to a second end 30 of the panel 20 that is disposed opposite the first end 28. The arm 22 is extended away from the panel 20 as the panel 20 rotates at the first end 28 and the second end 30 is lifted away from the floor 32. The arm 22 engages the track 18 to support the panel 20 in a vertical position with the second end 30 being spaced from the floor 32 of the cargo area 12.

The track 18 is disposed on the floor 32 of the cargo area 12. The track 18 defines a plurality of grooves 34. Panel assemblies 16 engage a groove 34 on the track 18 to define cargo compartments 24. The arm 22 is connected to the groove 34 on the track 18 to support the panel 20. A distal end 36 of the arm 22 defines an engagement portion 38. The engagement portion 38 of the arm 22 fits into the groove 34 on the track 18 to support the panel 20. The engagement portion 38 of the arm 22 and the groove 34 on the track 18 has complementary engagement features. The engagement portion 38 of the arm 22 and the groove 34 on the track 18 cooperate to define a rigid wall of the cargo compartment 24.

A single groove 34 is defined by the track 18 in the illustrated embodiment. Alternatively, the track 18 may define a plurality of grooves 34 that may be spaced apart by a fixed distance, or may be defined intermittently on the track 18. The arm 22 of the panel assembly 16 may fit into any groove 34 on the track 18 based upon a desired size of the cargo compartments 24. For example, an angle α defined between the first end 28 of the panel 20 and the floor 32 may vary the dimensions of the cargo compartments 24 depending on which groove 34 is engaged by the arm 22. As shown in FIG. 2, the rearmost panel assembly 16 is supported by the arm 22 in the groove 34 at a rear portion 37 of the track 18. The panel assembly 16 may be supported by the arm 22 in any of the grooves 34 on the track 18. The panel assemblies 16 may be positioned to define cargo compartments 24 having the desired dimensions. This allows the storage system 14 to be adapted to define appropriate sized cargo compartments 24.

The storage system 14 also defines cargo compartments 24 by interconnecting the panel assemblies 16. The engagement portion 38 at the distal end 36 of the arm 22 of the first panel assembly 15 engages the second end 30 of the second panel assembly 17. The engagement portion 38 at the distal end 36 of the arm 22 is adapted to engage an adjacent panel assembly 16. The arm 22 of the panel assembly 16 engages the second end 30 of an adjacent panel assembly 16 to define a plurality of cargo compartments 24.

The engagement portion 38 at the distal end 36 of the arm 22 of the first panel assembly 15 is selectively attached to the second end 30 of the second panel assembly 17 to connect two panels 20 within the plurality of panels 16. A cargo compartment 23 defined by interconnection between panel assemblies 16 may be larger than a cargo compartment 25 defined by interconnection between the panel assembly 16 and the track 18. A cargo compartment 23 defined by interconnection between panel assemblies 16 may also be smaller than a cargo compartment 25 defined by interconnection between the panel assembly 16 and the track 18 depending on which groove 34 the engagement portion 38 engages. The angle α may vary allowing for the cargo compartments 24 to define various sizes.

The arm 22 has a first surface 40 that defines a groove 42. The groove 42 on the first surface 40 of the arm 22 corresponds to the plurality of grooves 34 on the track 18. The groove 42 on the first surface 40 of the arm 22 may be the same size and shape as the plurality of grooves 34 on the track 18. The groove 42 on the first surface 40 of the arm 22 receives the engagement portion 38 at the distal end 36 of the arm 22.

For example, the engagement portion 38 at the distal end 36 of the arm 22 of the first panel assembly 15 may engage a groove 42 on the first surface 40 of the second arm 23 of the second panel assembly 17. The first panel assembly 15 defines a cargo compartment 24 while the second panel assembly 17 may be collapsed against the floor 32 of the cargo area 12.

Figure 3:
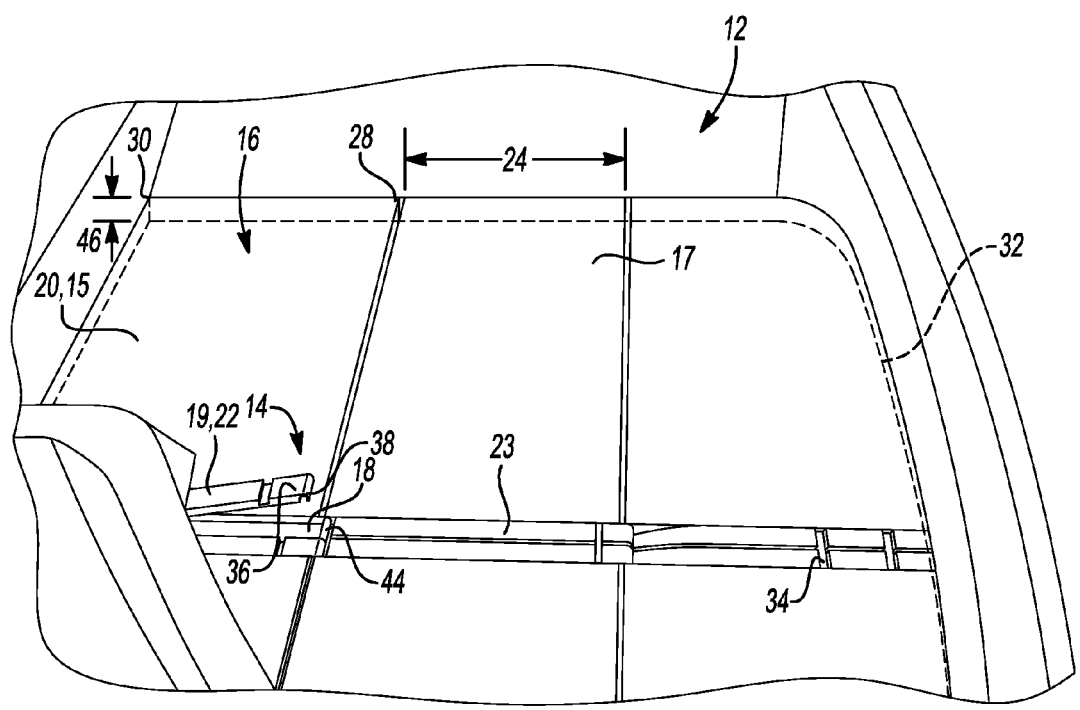
FIG. 3 is a fragmentary perspective view of a vehicle cargo area with the storage system shown in FIG. 1 in a collapsed position.

Referring to FIG. 3, the cargo area 12 is shown with the collapsed storage system 14 of the present disclosure. When the panel assembly 16 is in a horizontal or collapsed position, the panel assembly 16 is in contact with the floor 32 of the cargo area 12. In this configuration, both the first end 28 and the second end 30 are in contact with the floor 32 of the cargo area 12. The panel assembly 16 is disposed lying flat against the floor 32 when the storage system 14 is not in use. This saves space within the cargo area 12 when the storage system 14 is not needed and it allows for larger items to be stored within the cargo area 12. Allowing the panel assemblies 16 to lay flat against the floor 32 of the cargo area 12 adds adaptability to the storage system 14.

The arm 22 of the panel assembly 16 engages the track 18 to secure the panel assemblies 16 against the floor 32 of the cargo area 12 when the panel assemblies 16 are collapsed against the floor 32 of the cargo area 12. The arm 22 may be rotatably engaged with the panel 20. The distal end 36 of the arm 22 rotates toward the first end 28 of the panel 20 as the first end 28 of the panel 20 hinges, moving the second end 30 of the panel 20 toward the floor 32. The arm 22 moves toward a parallel position with the track 18.

The engagement portion 38 of the distal end 36 of the arm 22 engages a groove 34 on the track 18 when the arm 22 is parallel with the track 18 and the panel 20 is collapsed against the floor 32. The complementary shapes of the engagement portion 38 and the groove 34 allow the arm 22 to lock onto the track 18. The attachment between the engagement portion 38 of the arm 22 and the groove 34 on the track secure the panel assembly 16 against the floor 32 of the cargo area 12. Securing the panel assembly 16 against the floor 32 ensures the panel assemblies 16 maintain a collapsed position with the floor 32. This prevents disturbances to the operator of the vehicle 10 and prevents damage to potential items stored when some of the panel assemblies 16 are collapsed against the floor 32.

The panel assembly 16 further includes a protrusion 44. The protrusion may be attached to the second end 30 of the panel 20. The protrusion 44 may also be attached to the arm 22 at the second end 30 of the panel 20. The protrusion 44 has a shape complementary to the shape of engagement portion 38 at the distal end 36 of the arm 22. The engagement portion 38 of the arm 22 is configured to snap onto the protrusion 44. The panel assembly 16 locks against the floor 32 of the cargo area 12 when the engagement portion 38 of the arm 22 snaps onto the protrusion 44.

Panel assemblies 16 may have a thickness 46 such that minimal space within the cargo area 12 of the vehicle 10 is occupied. The thickness 46 of the panel assembly 16 does not substantially raise the level of the floor 32 when the panel assemblies 16 are collapsed against the floor 32 of the cargo area 12. Maintaining a minimum panel thickness 46 such that the floor 32 of the cargo area 12 does not substantially increase in height increases the usable space of the cargo area 12. The storage system 14 may use substantially the entire cargo area as a cargo compartment 24 due to the minimal thickness 46 of the panel assemblies 16. This allows the storage system 14 to more efficiently use the space within the cargo area 12 when larger or bulkier items need to be secured within the cargo area 12.

Figure 4:
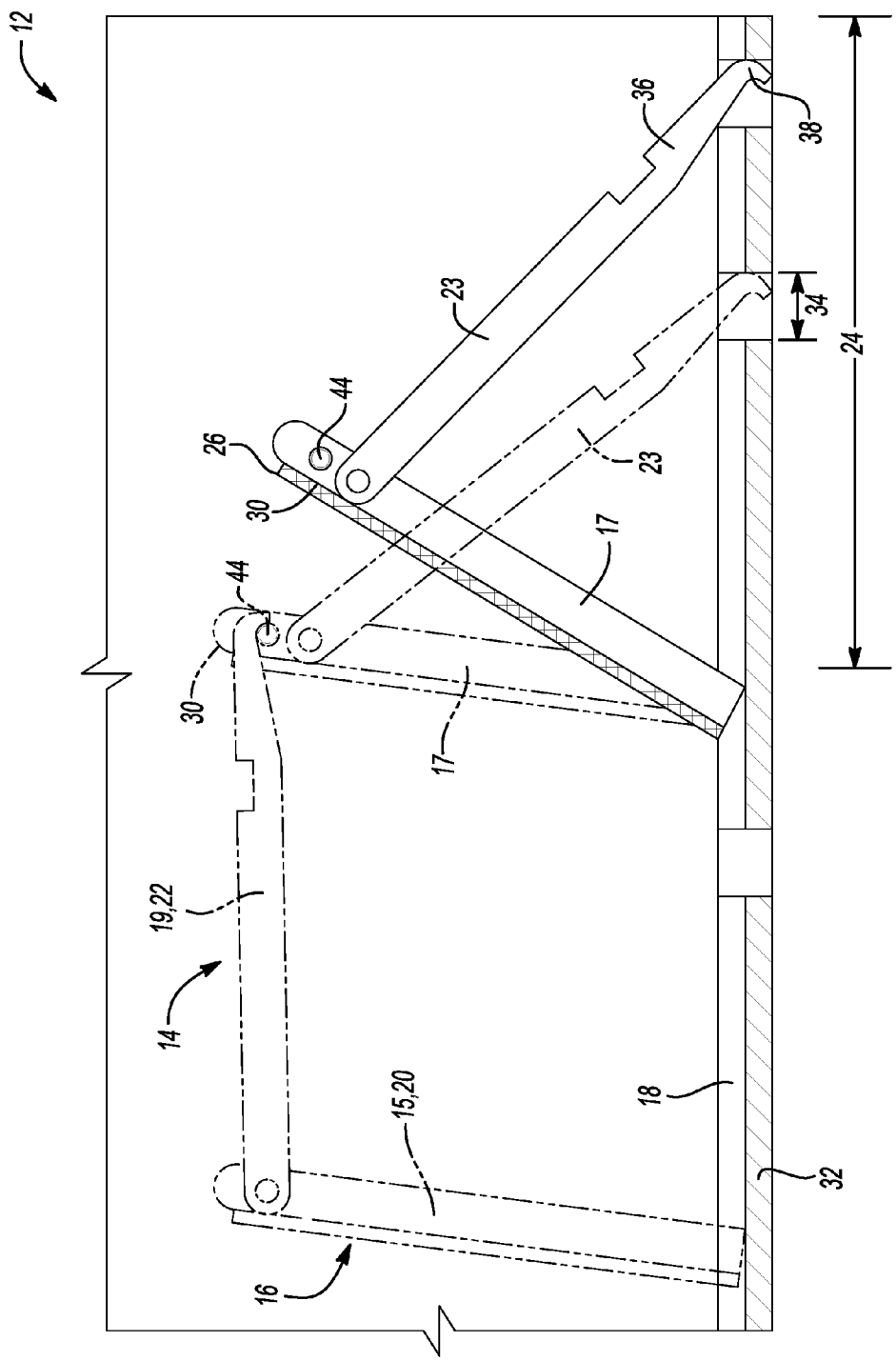
FIG. 4 is a diagrammatic view of storage system panel assembly.

Referring to FIG. 4, a magnified perspective view of the protrusion 44 of the panel assembly 16 is shown. The protrusion 44 attaches to the engagement portion 38 of the arm 22 to lock the panel assemblies 16 either vertically to define cargo compartments 24 or collapsed to the floor 32 of the cargo area 12. Locking the panel assemblies 16 together vertically, defining a plurality of cargo compartments 24 ensures that the panel assemblies 16 do not inadvertently collapse while the storage system 14 is in use. Locking the panel assemblies 16 while collapsed to the floor 32 ensures that the storage system 14 does not provide disturbances to an operator of a vehicle 10. Fig. 4 depicts the plurality of panel assemblies 16 in different positions. For example, the first panel assembly 15 uses the arm 22 to lock onto the second panel assembly 17, which is depicted in hidden, and second panel assembly 17 uses the second arm 23 to support the second panel assembly 17 within the groove 34, which is depicted in solid.

The protrusion 44 may be attached to the panel 20 at the second end 30 of the panel 20. The protrusion 44 may also be disposed on the arm 22 opposite of the distal end 36 of the arm 22. The shape of the protrusion 44 may be square, hexagonal, or any other shape that allows the engagement portion 38 of the arm 22 to snap and lock into place with the protrusion 44. Alternatively, the protrusion 44 may define a circular shape.

The protrusion 44 may also be used during deployment of storage system 14. The panel assemblies 16 may be deployed individually or as a pair of panel assemblies 16. The engagement portion 38 is locked with the protrusion 44 when the panel assemblies 16 are collapsed on the floor 32 of the cargo area 12. Deploying the first panel assembly 15 causes second panel assembly 17 to deploy along with first panel assembly 15. The protrusion 44 of the first panel assembly 15 may be joined with the engagement portion 38 of the arm 22 disposed on the second panel assembly 17.

The second panel assembly 17 may also hinge to define the cargo compartment 24 when the first panel assembly 15 hinges about the first end 28. This is due to the transfer of force through the protrusion 44 on the first panel assembly 15 to the engagement portion 38 of the arm 22 of the second panel assembly 17. Rotation of either the first panel assembly 15 or the second panel assembly 17 causes the corresponding panel assembly 16 to rotate. If only a single panel assembly 16 is needed, the second panel assembly 17 may detach from the first panel assembly 15. It may also be advantageous to support the second panel assembly 17 using the groove 34 on the track 18. The engagement portion 38 of the arm 22 may disengage from the protrusion 44 of the first panel assembly 15 to engage the groove 34 on the track 18. The protrusion 44 allows the storage system 14 to define a plurality of cargo compartment configurations and increases the flexibility and adaptability of the storage system 14. The collapsibility, flexibility, and adaptability of the storage system 14 create an efficient and effective use of the cargo area 12 of the vehicle 10.

What is claimed is:

1. A vehicle having a storage compartment comprising:
a vehicle floor defining a track;
a plurality of panels pivotally connected to the floor; and
an arm pivotally attached to an upper portion of each panel of the plurality of panels, the arm being pivoted to a folded position in plane with each panel of the plurality of panels, to a floor supported position connected to the track, and to a panel supported position connected to each adjacent panel within the plurality of panels.

2. The vehicle of claim 1, further comprising a protrusion disposed on the arm and connected to each panel of the plurality of panels configured to receive and engage the arm to further define a cargo compartment.

3. The vehicle of claim 2, wherein each panel of the plurality of panels are configured to interconnect, via the protrusion and the arm, to define a plurality of cargo compartments.

4. The vehicle of claim 1, further comprising a net attached to the panels.

5. The vehicle of claim 1, wherein the arm is further configured to disengage from the track such that each panel of the plurality of panels are configured to collapse substantially parallel to the vehicle floor.

6. The vehicle of claim 1, wherein the arm defines a groove on a first surface of the arm.

7. A vehicle storage system comprising:
a panel hingedly connected to a vehicle floor;
a track disposed on the vehicle floor adjacent to the panel and defining a groove; and
an arm having a first end disposed on the panel such that the arm rotates relative to the panel about the first end, and a second end configured to, upon rotation, engage the groove to support the panel in a substantially vertical position.

8. The storage system of claim 7, further comprising a protrusion disposed on the arm at the first end of the arm such that an engagement portion at the second end of the arm is configured to snap onto the protrusion.

9. The storage system of claim 7, wherein the arm includes a groove disposed proximate the first end on a first surface of the arm.

10. The storage system of claim 7, wherein the panel is in a substantially vertical position when the second end of the arm fits into the groove on the track.

11. The storage system of claim 7, wherein the arm is received in the groove when the panel is collapsed against the vehicle floor.

12. A vehicle storage system comprising:
a panel having first and second ends, wherein the first end is hingedly connected to a vehicle floor, and the second end is moveable relative to the vehicle floor; and
an arm pivotally connected to the second end of the panel and having a distal end of the arm pivotable about the first end of the panel, wherein the second end of the panel the vehicle floor engages with an engagement portion of the arm wherein the arm is positioned at a first angle relative to the panel to support the panel at a second angle relative to the vehicle floor.

13. The vehicle storage system of claim 12, further comprising a protrusion disposed on the second end of the panel configured to receive a second arm attached to a second panel such that the arm is configured to engage the protrusion and support the second panel substantially perpendicular to the vehicle floor.

14. The vehicle storage system of claim 13, wherein the protrusion is further configured to receive the arm such that the arm is configured to engage the protrusion and lock the panel substantially parallel to the vehicle floor.

15. The vehicle storage system of claim 12, further comprising a net disposed on a surface of the panel.

16. The vehicle storage system of claim 12, wherein the arm is further configured to collapse toward the vehicle floor such that the panel is substantially parallel to the vehicle floor.

* * * * *